March 25, 1952  E. A. ARNOLD  2,590,361
TRACTOR JACK
Filed Jan. 30, 1948
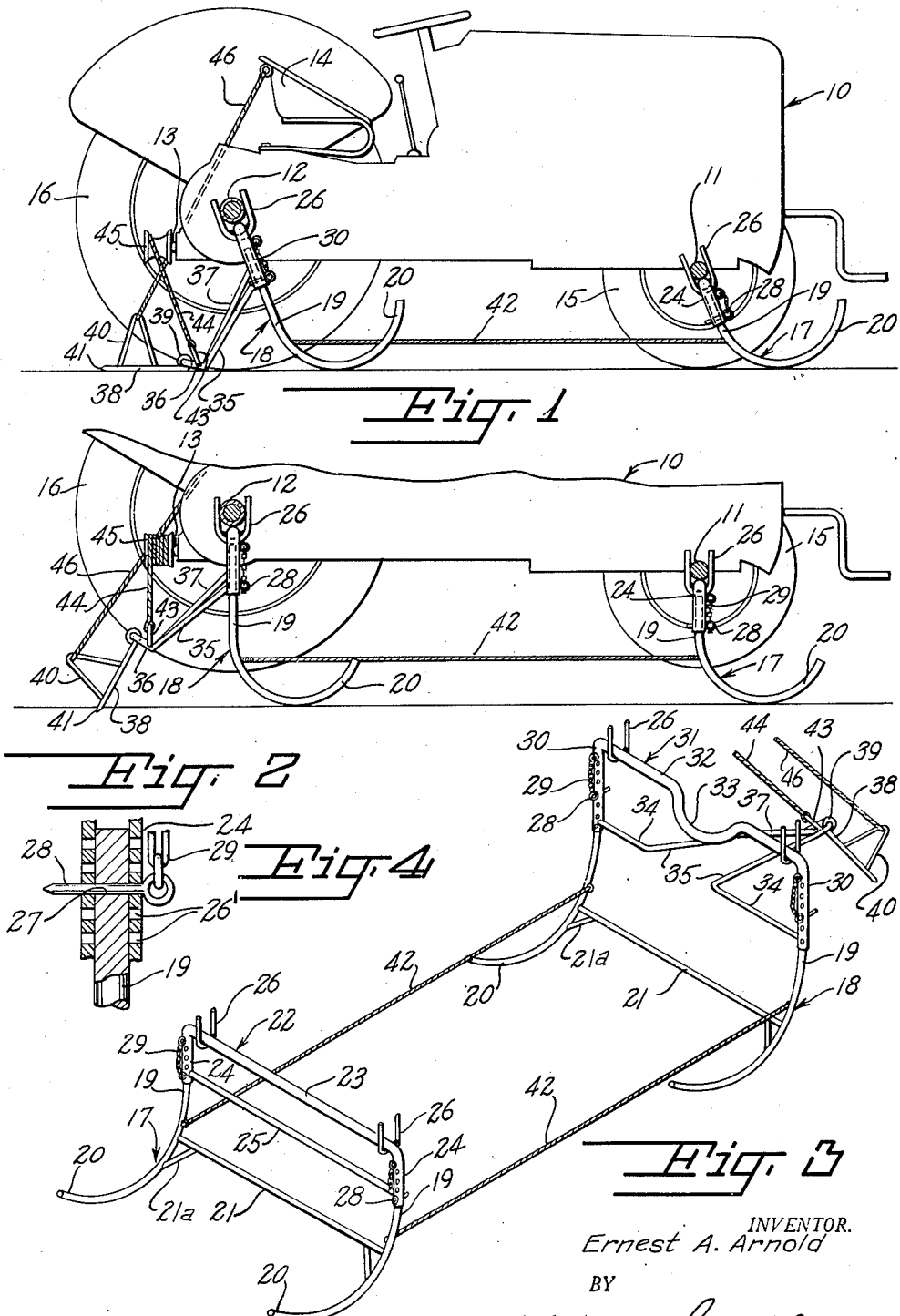
INVENTOR.
Ernest A. Arnold
BY
McMorrow, Berman & Davidson
Attorneys Patented Mar. 25, 1952

2,590,361

UNITED STATES PATENT OFFICE 2,590,361

TRACTOR JACK

Ernest A. Arnold, Monument, Kans.

Application January 30, 1948, Serial No. 5,291

7 Claims. (Cl. 254—94)

My invention relates to tractor jacks, and more particularly to such jacks as are adapted to simultaneously raise the front and/or the rear wheels of a tractor off of a supporting surface, and which jacks are power operated from the power take-off shaft of the tractor.

It is frequently necessary in normal use of a tractor to adjust the width of the same by moving the wheels thereof inwardly or outwardly on their shafts, whereby to correctly position the wheels relative to the spacing or sizes of the rows of a crop to be worked. Such adjustment normally requires each wheel to be separately jacked up and adjusted, whereby considerable time and effort is consumed. Such time loss may mean serious losses in tractor-hours when such adjustments are made several times in one day.

With the foregoing in view, an object of my invention is to provide an improved tractor jack.

A further object is to provide an improved tractor jack wherein the front and/or the rear wheels of a tractor are simultaneously elevated off of a supporting surface by a plurality of rocker jacks pivotally and detachably associated with the tractor axles.

A further object is to provide an improved tractor jack of the single-throw type which includes means for adjusting the height to which the tractor is to be raised and/or which includes novel brace means for maintaining the jacks in elevated positions, and/or which includes novel means for actuating the jacks.

Other objects and advantages reside in the particular structure of the invention and of the several parts thereof, combination and arrangement of the several parts, all of which will be readily apparent to those skilled in the art upon reference to the attached drawing in connection with the following specification, wherein the invention is shown, described and claimed.

In the drawing:

Figure 1 is a longitudinal vertical section through a tractor showing a jack according to the invention applied thereto, the jack being shown in side elevation and in a retracted position;

Figure 2 is a view like Figure 1, but showing the jack in the actuated or extended position;

Figure 3 is a perspective view taken from the right of Figures 1 and 2, and showing the jack according to the invention apart from the tractor;

Figure 4 is an enlarged fragmentary vertical section showing a detail.

Referring specifically to the drawing, wherein like reference characters have been used throughout the several views to designate like parts, 10 designates generally any suitable or well known tractor which includes a front axle 11, a rear axle 12, and a power take-off shaft 13. The tractor is provided with any suitable seat 14 and front and rear ground-engaging wheels 15 and 16, respectively.

The jack according to the invention comprises a front jack member 17 and a rear jack member 18. The jack member 17 comprises a pair of identical legs 19 which have integral rocker feet 20 formed thereon. The feet 20 are forwardly extended from the legs 19. The legs 19 are rigidly connected together for simultaneous actuation by means of a cross-brace 21 which may be reinforced by suitable struts 21a. The jack member 17 also includes a bracket 22 which includes a bight 23 connecting integral depending tubular legs 24 which telescopically receive the upper ends of the legs 19 aforesaid. A cross-brace 25 may rigidly connect legs 24 together below the bight 23. The bight 23 has fixed thereon in any suitable manner, as by welding, a pair of laterally-spaced, upwardly-directed yokes 26 which are adapted to partially encircle the front axle 11 of the tractor, whereby the bight 23 underlies such front axle and is pivotally associated therewith. The legs 24 of the bracket 23 are formed with a plurality of apertures 26' therethrough and the upper ends of the legs 19 have at least one aperture 27 formed therethrough adapted to be aligned with a selected one of the apertures 26'. Any suitable pin, such as 28, Figure 4, is adapted to be inserted through aligned apertures 26' and 27, whereby to maintain the legs 19 and 24 in adjusted telescoped relation. A suitable flexible member 29 may be connected to the pin 28 and to the bracket 22 to prevent loss of the pin.

The rear jack member 18 is very similar to the front jack member 17 and comprises identical jack legs 19 and rocker feet 20. The sole difference is that the legs 19 of the rear jack members may be longer in the event that the rear axle 12 is, as shown, slightly higher than the front axle 11. The upper ends of the rear legs 19 are telescopically-received in the depending tubular legs 30 of a rear bracket 31 which includes a bight 32. The bight 32 may be cranked, as at 33, downwardly to clear the differential of the tractor. The legs 30 are apertured and the upper ends of the rear legs 19 are apertured, whereby a pin 28 is insertible therethrough to maintain the legs and bracket legs in telescoped adjusted relation. In like manner, the bight 32 includes yokes 26 for engaging the rear axle 12.

The legs 30 of the rear bracket 31 are connected by a suitable cross-brace 34, the central portion of which may be rearwardly extended to provide a rigid lever arm 35. The rear end portion of the arm 35 may be directed at an angle as to provide a foot 36. A suitable diagonal strut 37 may be provided to connect the foot portion 36 to the cranked portion 33 of the bight 32, whereby to give rigidity to the lever arm 35. A brace member 38 is pivotally connected to the foot 36, as by the looped portion 39. The brace 38 includes a pointed free end portion 41 which is adapted to be inserted in the ground or other supporting surface to maintain the lever arm 35 elevated, as will appear later. The brace 38 also provides a trip arm 40 which extends upwardly and rearwardly thereof. Suitable flexible members 42 connect the front and rear jack members 17 and 18 together for simultaneous actuation. At the same time, such flexible members 42 permit the jack members to be juxtaposed when not in use, whereby the jack occupies but substantially little space. The foot 36 of the lever arm 35 is connected to a flexible member 44 which in turn is operatively connected to a drum 45 which is fixed on the power take-off shaft 13 of the tractor in any suitable manner, not shown. A suitable flexible member 46 connects the trip arm 40 to the seat 14 or some other convenient location.

The operation of the device will now be stated. When it is desired to jack up the tractor for any purpose, the jack members 17 and 18 are inserted in the positions shown in Figure 1, whereby the yokes 26 partially encircle the front and rear axles 11 and 12 and the bracket legs 30 and 24, together with the associated jack legs 19, extend forwardly and downwardly with the feet 20 engaging the supporting surface. At the same time, the lever arm 35 extends rearwardly so that the foot 36 engages the supporting surface to maintain the jacks in the Figure 1 position. The drum 45 is now fixed to the take-off shaft 13 and the flexible connection 44 is operatively connected to the drum and to the lever arm. Thereafter, upon rotation of the take-off shaft 13 and the fixed drum 45, the flexible connector 44 will be wound onto the drum, whereby the lever arm 35 will be raised. By virtue of the rigid connection between the lever arm 35 and the rear bracket 31, the rear jack member 18 is rocked upwardly and forwardly on the feet 20, whereby to raise the rear end of the tractor. At the same time, by virtue of the flexible connection 42 between the front and rear jack members, the front jack member 17 is simultaneously actuated to a raised position, whereby the front wheels 15 are raised clear of the ground and the tractor assumes the position seen in Figure 2. At the same time, as the lever arm 35 is elevated, the brace 38 drops downwardly by gravity, whereby the point 41 thereof engages in the supporting surface to maintain the lever arm 35 in an elevated position. For instance, if the drum 45 has been used as a capstan by merely taking a few turns of the member 44 thereabout and manually tensioning the free end of member 44, the tethered end and lever arm 35 will be drawn upwardly in a well known manner. However, as soon as the manual tension on the free end of member 44 is eased, no power is transmitted thereto and the lever arm 35 will drop down if it is not supported by the base 38. As this is a simple and effective way of attaching the flexible member 44 to the drum 45, the base 38 is very effective for automatically positioning itself to maintain the lever arm 35 supported when the free end of the flexible member 44 is slackened. Thus, the jack members 17 and 18 are prevented from rocking back to the Figure 1 position, while the wheels 15 and 16 are adjusted, or whatever other desired work is performed upon the jacked-up tractor. When it is desired to lower the tractor to the ground, the take-off shaft 13 is once more rotated in the original direction a part-rotation, whereby to elevate the lever arm 35 slightly more and disengage the point 41 of the brace 38 from the supporting surface. Thereafter, a pull on the trip line 46 will swing the brace 38 in a clockwise direction, Figures 1 and 2, whereby the same is raised to prevent re-engagement of the point 41 with the supporting surface. Then the power take-off shaft 13 is rotated in a reverse direction to permit gradual rocking of the jack members 17 and 18 rearwardly and a consequent gradual lowering of the tractor back to the Figure 1 position. Thereafter, the jack members are readily disassociated with the tractor 10 and stored or set aside for future use.

It will be apparent from the foregoing that while I have shown and described what is now thought to be the preferred embodiment of my invention, it is to be understood that the same is susceptible of other forms and expressions. Consequently, I do not limit myself to the precise structure shown and described hereinabove, except as hereinafter claimed.

I claim:

1. A jack for simultaneously lifting all four wheels of a tractor off of a supporting surface comprising a drum adapted to be fixed to the power take-off shaft of a tractor, a pair of jack members for the rear axle of the tractor, a second pair of jack members for the front axle of a tractor, said jack members each comprising a vertical leg and an integral rocker foot, means rigidly connecting the jack members of each pair together, a pair of inverted U-shaped brackets each including a bight adapted to underlie a tractor axle and a pair of depending tubular legs, said tubular legs of said brackets being open at the bottom and telescopically receiving the upper ends of said vertical legs of said jack members therein, said bights each including at least a pair of laterally-spaced and upwardly-directed yokes adapted to pivotally receive an axle therein, means operatively connecting said pairs of jack members together for simultaneous actuation, a rearwardly-directed lever arm, said arm including a forward end rigidly connected to said legs of said bracket mounting said first-named pair of jack members and a rear end normally engaging said supporting surface to maintain said jack members and brackets in rearwardly-inclined engagement with said axles, and a flexible member connecting said rear end of said lever arm to said drum, whereby rotation of said drum is effective to wind said flexible member onto said drum, raise said lever arm, rock all of said jack members forwardly simultaneously to raise the tractor off of the ground.

2. A jack for simultaneously lifting all four wheels of a tractor off of a supporting surface comprising a drum adapted to be fixed to the power take-off shaft of a tractor, a pair of jack members for the rear axle of the tractor, a second pair of jack members for the front axle of the tractor, said jack members each comprising a vertical leg and an integral rocker foot, means rigidly connecting the jack members of each pair together, a pair of inverted U-shaped brackets each including a bight adapted to underlie a tractor axle and a pair of depending tubular legs, said tubular legs of said brackets being open at the bottom and telescopically receiving the upper ends of said vertical legs of said jack members therein, said bights each including at least a pair of laterally-spaced and upwardly-directed yokes adapted to pivotally receive an axle therein, means operatively connecting said pairs of jack members together for simultaneous actuation, a rearwardly-directed lever arm, said arm including a forward end rigidly connected to said legs of said bracket mounting said first-named pair of jack members and a rear end normally engaging said supporting surface to maintain said jack members and brackets in rearwardly-inclined engagement with said axles, a flexible member connecting said rear end of said lever arm to said drum, whereby rotation of said drum is effective to wind said flexible member onto said drum, raise said lever arm, rock all of said jack members forwardly simultaneously to raise the tractor off the ground, a brace, means pivotally connecting said brace to said rear end of said lever arm, and said brace including a free rear end engageable with a supporting surface upon elevation of said lever arm to lock said arm in an elevated position.

3. A jack for simultaneously lifting all four wheels of a tractor off of a supporting surface comprising a drum adapted to be fixed to the power take-off shaft of a tractor, a pair of jack members for the rear axle of the tractor, a second pair of jack members for the front axle of the tractor, said jack members each comprising a vertical leg and an integral rocker foot, means rigidly connecting the jack members of each pair together, a pair of inverted U-shaped brackets each including a bight adapted to underlie a tractor axle and a pair of depending tubular legs, said tubular legs of said brackets being open at the bottom and telescopically receiving the upper ends of said vertical legs of said jack members therein, said bights each including at least a pair of laterally-spaced and upwardly-directed yokes adapted to pivotally receive an axle therein, means operatively connecting said pairs of jack members together for simultaneous actuation, a rearwardly-directed lever arm, said arm including a forward end rigidly connected to said legs of said bracket mounting said first-named pair of jack members and a rear end normally engaging said supporting surface to maintain said jack members and brackets in rearwardly-inclined engagement with said axles, a flexible member connecting said rear end of said lever arm to said drum, whereby rotation of said drum is effective to wind said flexible member onto said drum, raise said lever arm, rock all of said jack members forwardly simultaneously to raise the tractor off of the ground, a brace, means pivotally connecting said brace to said rear end of said lever arm, said brace including a free rear end engageable with a supporting surface upon elevation of said lever arm to lock said arm in an elevated position, a trip arm fixed to said brace and extending upwardly therefrom, and said trip arm comprising means for tripping said brace to permit lowering of said lever arm.

4. A jack for lifting at least the rear wheels of a tractor off of a supporting surface comprising a drum adapted to be fixed to the power take-off shaft of a tractor, a pair of jack members for the rear axle of the tractor, means rigidly connecting said jack members together for simultaneous actuation, said jack members each comprising an upwardly-directed leg and a rocker foot rigidly connected thereto, an inverted U-shaped bracket including a bight adapted to underlie said rear axle and depending tubular legs telescopically receiving said legs of said jack members, means for securing said telescoped legs together in adjusted telescoped relation, said bight including means pivotally connecting said bracket to said axle, a rearwardly-directed lever arm fixed to said bracket, said lever arm including a rear end normally engaging a supporting surface to support said jack members and bracket in downwardly and forwardly-inclined relation to said axle, a flexible connection between said rear end of said lever arm and said drum, whereby to elevate said lever arm upon rotation of said drum and rock said jack members forwardly to elevate said axle, a brace carried by said lever arm and automatically engageable with said supporting surface upon elevation of said lever arm to maintain the same elevated.

5. A jack for lifting at least the rear wheels of a tractor off of a supporting surface, comprising a rocker jack for the rear axle of the tractor, said jack comprising an upwardly-directed leg and a rocker foot rigidly connected thereto, said jack including means for detachably and pivotally connecting the same to said axle, a rearwardly-directed lever arm fixed to said leg of said jack, said lever arm including a rear end normally engaging said supporting surface to support said jack in downwardly inclined relation with respect to said axle, means adapted to be connected to a power takeoff shaft of a tractor and operatively connected to said lever arm for rotating the latter to thereby raise and lower said jack, and a brace carried by said lever arm, and said brace being automatically engageable with said supporting surface upon elevation of said lever arm to maintain the same elevated.

6. A jack for lifting at least the rear wheels of a tractor off of a supporting surface, comprising a rocker jack for the rear axle of the tractor, said jack comprising an upwardly-directed leg and a rocker foot rigidly connected thereto, said jack including means for detachably and pivotally connecting the same to said axle, a rearwardly-directed lever arm fixed to said leg of said jack, said lever arm including a rear end normally engaging said supporting surface to support said jack in downwardly and forwardly-inclined relation with respect to said axle, means adapted to be connected to a power takeoff shaft of a tractor and operatively connected to said lever arm for rotating the latter to thereby raise and lower said jack, said means comprising a drum carried by said power takeoff shaft and a flexible cable between the rear end of said lever arm and said drum, a brace carried by said lever arm, said brace being automatically engageable with said supporting surface upon elevation of said lever arm to maintain the same elevated, and remotely-controlled trip means for disengaging said brace from said supporting surface whereby to permit lowering of said lever arm.

7. A jack for elevating at least the rear wheels of a tractor above a supporting surface comprising, a rocker jack positioned adjacent the rear axle of said tractor and mounted on the latter for rocking movement about said axle, a rearwardly directed lever arm having one end fixedly secured to said jack and having the other end engaging said supporting surface to support said jack in downwardly inclined relation with respect to said axle, means adapted to be connected to a power takeoff shaft of a tractor and operatively connected to said lever arm for effecting said rocking movement of said jack to thereby elevate said axle above said supporting surface, and a brace pivotally connected to the other end of said lever arm, said brace being automatically engageable with said supporting surface when said axle is elevated for maintaining the latter in its elevated position.

ERNEST A. ARNOLD.

REFERENCES CITED

The following references are of record in the file of this patent:

UNITED STATES PATENTS

| Number | Name | Date |
|---|---|---|
| 1,098,639 | Richards | June 2, 1914 |
| 1,434,543 | Hughes | Nov. 7, 1922 |
| 2,178,280 | Hutchins et al. | Oct. 31, 1939 |
| 2,324,350 | Baal | July 13, 1943 |
| 2,348,743 | McCue | May 16, 1944 |